(12) United States Patent
Fredenburg et al.

(10) Patent No.: US 10,031,992 B2
(45) Date of Patent: Jul. 24, 2018

(54) CONCURRENTLY OPTIMIZED SYSTEM-ON-CHIP IMPLEMENTATION WITH AUTOMATIC SYNTHESIS AND INTEGRATION

(71) Applicant: Movellus Circuits Incorporated, Ann Arbor, MI (US)

(72) Inventors: Jeffrey Fredenburg, Ann Arbor, MI (US); Muhammad Faisal, Ann Arbor, MI (US); David M. Moore, Ann Arbor, MI (US); Ramin Shirani, Morgan Hill, CA (US)

(73) Assignee: Movellus Circuits, Inc., Ann Arbor, MI (US)

( * ) Notice: Subject to any disclaimer, the term of this patent is extended or adjusted under 35 U.S.C. 154(b) by 0 days.

(21) Appl. No.: 15/390,360

(22) Filed: Dec. 23, 2016

(65) Prior Publication Data
US 2018/0181684 A1   Jun. 28, 2018

(51) Int. Cl.
*G06F 17/50* (2006.01)

(52) U.S. Cl.
CPC ........ *G06F 17/505* (2013.01); *G06F 17/5027* (2013.01); *G06F 17/5031* (2013.01); *G06F 2217/06* (2013.01); *G06F 2217/12* (2013.01)

(58) Field of Classification Search
CPC ...................................................... G06F 17/505
USPC ........................................................ 716/104
See application file for complete search history.

(56) References Cited

U.S. PATENT DOCUMENTS

| | | | |
|---|---|---|---|
| 2009/0158061 A1* | 6/2009 | Schmitz | G06F 1/3228 713/300 |
| 2017/0168520 A1* | 6/2017 | Yu | G06F 1/12 |
| 2017/0193136 A1* | 7/2017 | Prasad | G06F 17/505 |

* cited by examiner

*Primary Examiner* — Suchin Parihar
(74) *Attorney, Agent, or Firm* — Lance Kreisman; Peninsula Patent Group (57) ABSTRACT

A computer-implemented method for manufacturing an integrated circuit (IC) chip includes defining digital block specifications for the IC; and automatically synthesizing and integrating digital blocks with support circuits in accordance with the digital block specifications.

18 Claims, 6 Drawing Sheets

CONCURRENTLY OPTIMIZED SYSTEM-ON-CHIP IMPLEMENTATION WITH AUTOMATIC SYNTHESIS AND INTEGRATION

TECHNICAL FIELD

The disclosure herein relates to electronic design automation (EDA) tools. More particularly, the disclosed embodiments relate to methods, systems, and user interfaces for implementing analog circuit blocks in a digital design flow.

BACKGROUND

Electronic design automation (EDA) tools are often used to generate a detailed design of a semiconductor circuit. Computer-implemented tools such as computer-aided design (CAD) tools are often used to carry out the design flow. Many of the operations may be implemented as software running on computer servers and/or workstations.

A typical digital design flow may involve generating a system specification that provides design parameters for the semiconductor circuit to one or more of the EDA tools. A circuit implementing the system specification may then be generated manually or automatically (such as by using ready-made IP functions). The circuit may be entered by a hardware description language (such as Verilog, VHDL, or any other hardware description language (HDL)), or by other means. In a logic synthesis operation, an abstract form of desired circuit behavior (typically a register transfer level (RTL) description or behavioral description) is turned into a design implementation in terms of logic gates. In a verification operation, the netlist output by the logic synthesis operation is verified for functionality against the circuit design specification. A physical implementation of the netlist may then be performed, including an analysis to verify functionality, timing and performance across predetermined or user-specified ranges of process, voltage, and temperature parameters.

Digital blocks implemented in an integrated circuit generally require support circuits in the form of timing sources and/or power sources. The timing sources may involve clock generators or oscillators, phase-locked loops, delay-locked loops and the like. Typical power sources may include voltage regulators and power management units (PMUs).

Conventionally, the implementation of support circuits is carried out in a complex customized fashion that is separate from the digital design flow. The separate design flows render the overall process more complicated, costly, and less efficient. Accordingly, what is needed are methods, systems and associated apparatus that allow for the manufacture of integrated circuits in a less complicated, cheaper, and more efficient manner.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Embodiments of a computer-implemented method for manufacturing an integrated circuit chip are disclosed. In one embodiment, a computer-implemented method for manufacturing an integrated circuit chip includes defining digital block specifications for the IC; and automatically synthesizing and integrating digital blocks with support circuits in accordance with the digital block specifications.

In another embodiment, a non-transitory computer-readable storage medium is disclosed. The medium stores instructions that when executed by a computer system will cause the computer system to, in response to a command from a client to commence operations for a digital design flow for a digital system, perform an architectural level emulation of the IC based on digital block specifications; and automatically synthesize and integrate digital blocks with support circuits in accordance with the digital block specifications.

Figure 1:
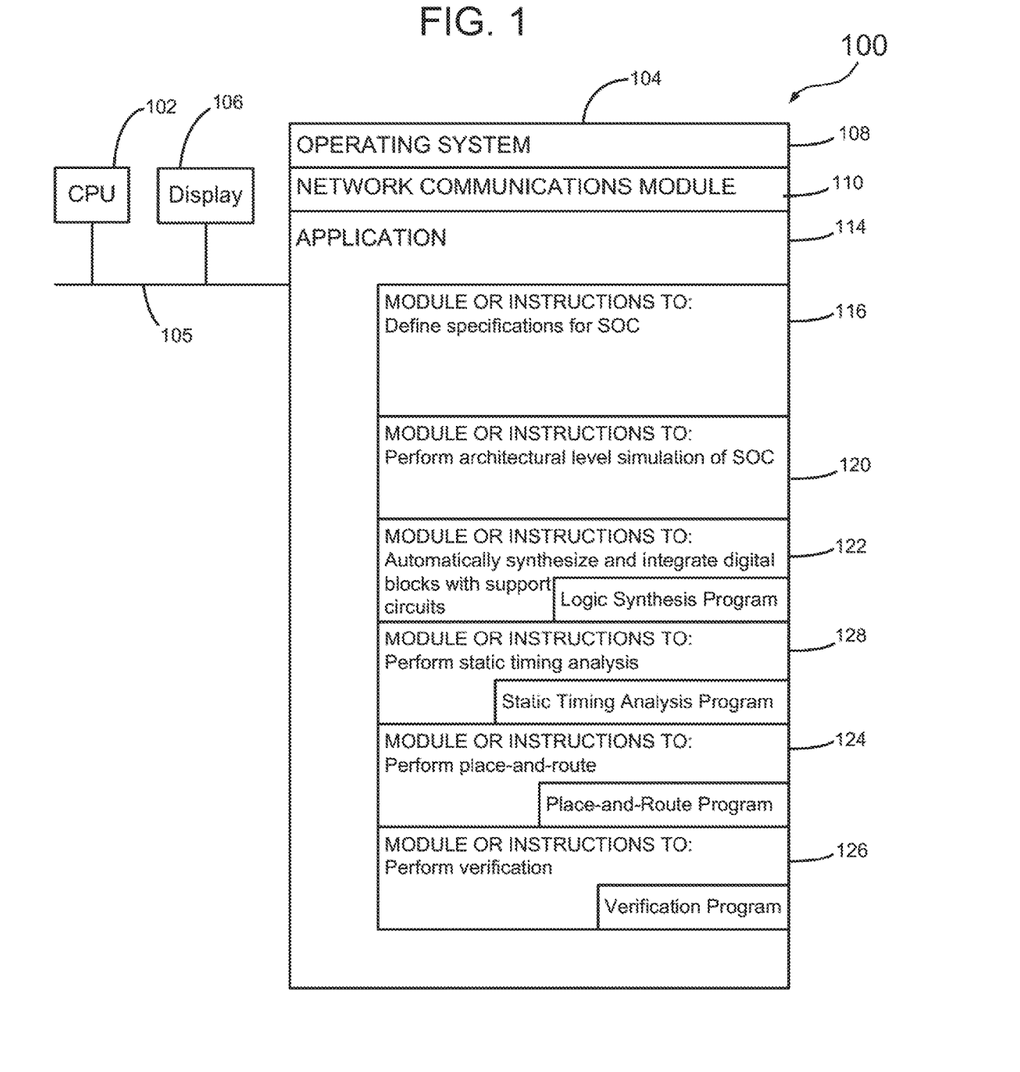
FIG. 1 illustrates one embodiment of an electronic design automation (EDA) system.

FIG. 1 illustrates one embodiment of an electronic design automation system (e.g., a server, a workstation, or other computer system), generally designated 100, that may be used to generate the detailed design of a digital system embodied as a semiconductor circuit. The system 100 may include one or more processors 102 for executing modules, programs and/or instructions stored in a memory 104. The system 100 may also include a display 106 that may be local or remote from the system. One or more communication busses 105 couples the processors to the memory. For some embodiments, the memory 104 may include high-speed main memory in the form of DRAM and may also include bulk memory in the form of one or more magnetic or optical disk-storage devices or solid state storage devices, or network access to cloud storage located remotely from the processors.

With continued reference to FIG. 1, the memory 104, or alternatively memory device(s) within the memory 104, comprises a computer-readable storage medium. In some embodiments, the memory 104 stores a variety of programs, modules and data structures, or a subset or superset thereof. An operating system 108 includes procedures for handling various basic system services and for performing hardware-dependent tasks. A network communications module (or instructions) 110 may be used for connecting the system 100 to other computers via a communication interface (not shown) and one or more communications networks, such as the Internet, other wide area networks, metropolitan area networks, and local area networks. An application or program 114 controls the operation and function of the system.

For some embodiments, and further referring to FIG. 1, the application or program 114 may include one or more programs, modules, or a subset or superset thereof. For example, a specifications module may be included that defines specifications for a system-on-chip (SOC) integrated circuit chip, at 116. The applications may also include a simulation module, at 120, to perform an architectural level simulation of the SOC. Respective logic synthesis, place-and-route, and verification modules 122, 124 and 126, are also provided to carry out logic synthesis, place-and-route, and verification operations. To provide for highly accurate timing analysis for the analog parallel multi-state driver circuit representations, a static timing analysis module 128 is provided. The static timing analysis module provides for coordinated operations concurrent with the various modules described above to provide for circuit design optimization at various stages of the digital design flow.

Figure 2A:
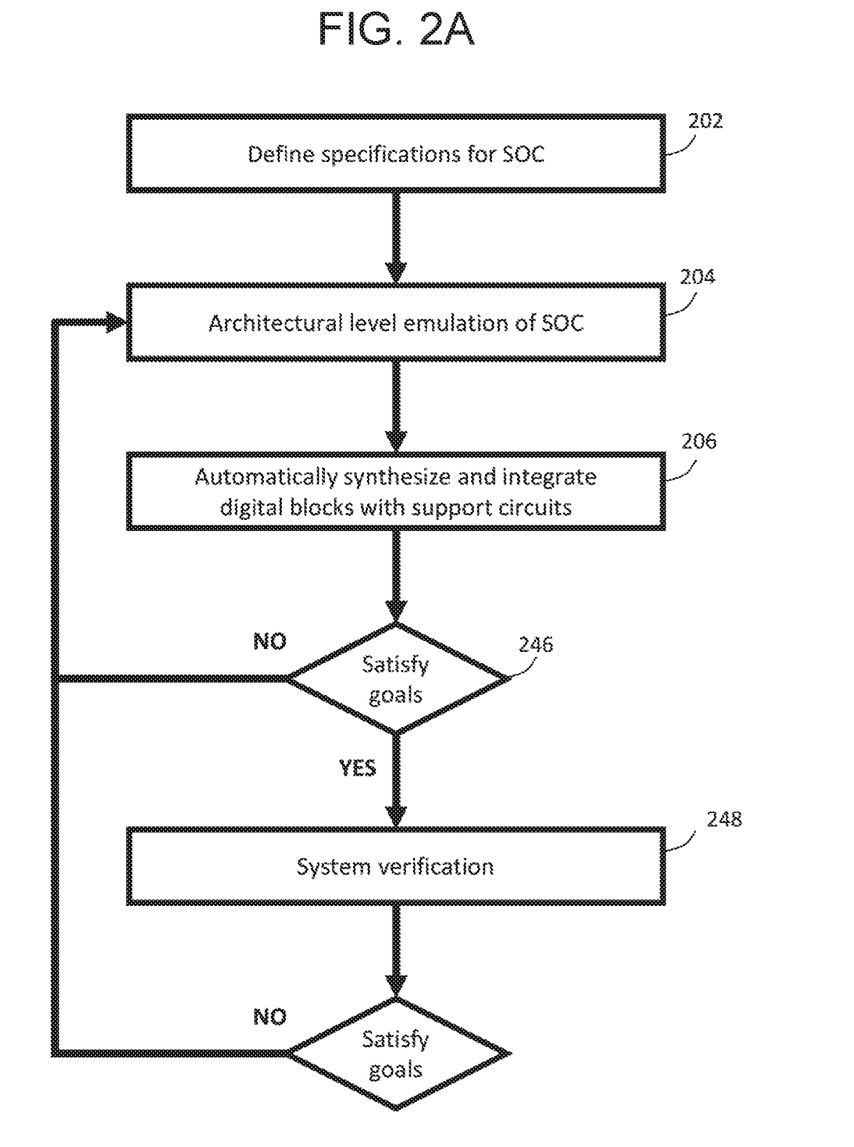
FIG. 2A illustrates a flowchart of steps for one embodiment of a method for manufacturing an integrated circuit utilizing the system of FIG. 1.

FIG. 2A illustrates a flow chart of steps for one embodiment of a method for designing a system-on-chip (SOC) using concurrent optimization and automatic synthesis and integration of digital blocks with support circuits. The method begins by defining the SOC specifications, at 202. The SOC specifications may include various requirements and functionality of the overall SOC. Other aspects of the SOC specifications may involve the connectivity and/or topology of the overall SOC, including power pins, input pins, output pins, clock pins, communication protocols used by the input and output pins, and so forth.

Further referring to FIG. 2A, following defining of the SOC specifications, an architectural level emulation of the SOC is performed, at 204. The emulation may be a system level simulation using programming languages such as Matlab, C, Verilog, etc. to verify that the system functions as required.

With continued reference to FIG. 2A, after performing the emulation, the method includes automatically synthesizing and integrating the digital blocks with support circuits, at 206. Generally, the support circuits may include timing sources, power sources, and/or various interfaces. The support circuits are automatically generated in the form of HDL using the digital block design constraints. Concurrent with the support circuit generation, the digital blocks are synthesized, place-and-routed, and optimized with the support circuits. The functionality and performance of the digital blocks and the support circuits are concurrently verified using the same timing analysis and EMIR tool flows.

Figure 2B:
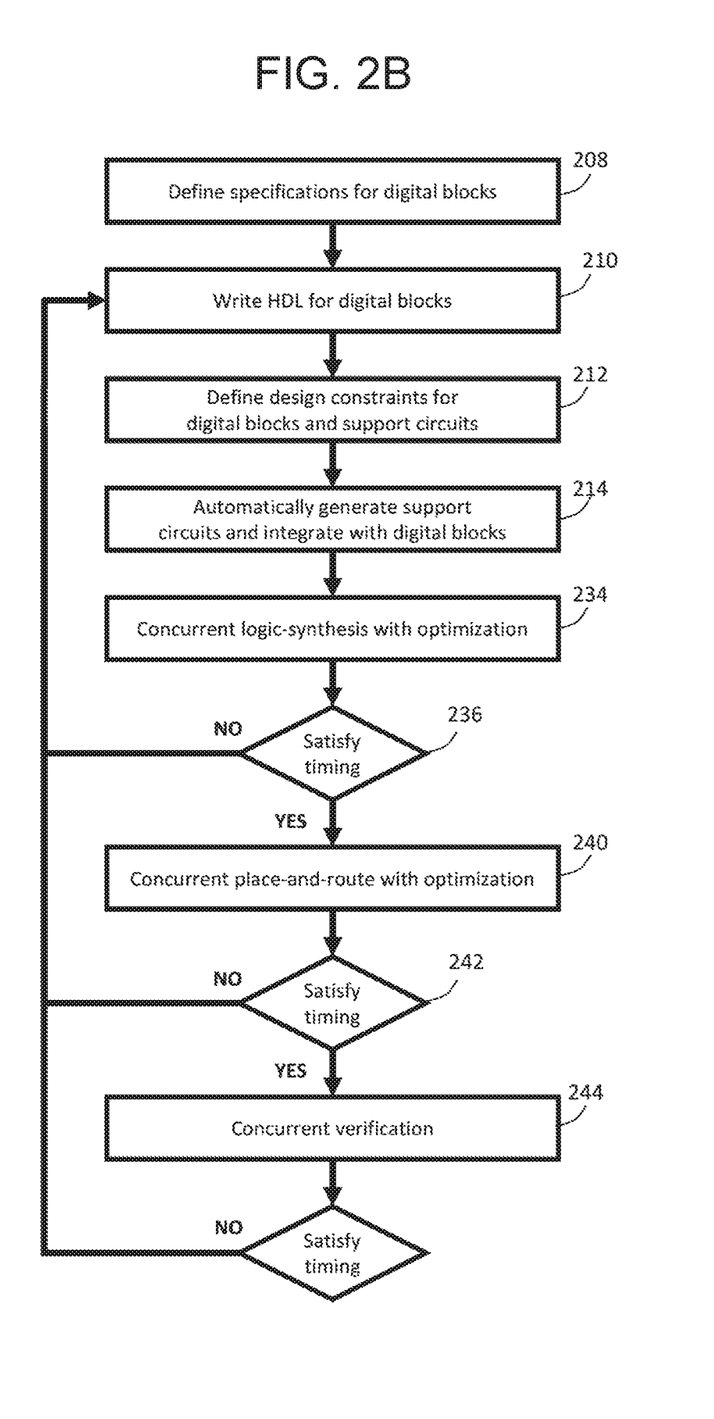
FIG. 2B illustrates steps corresponding to the automatically synthesize and integrate step of FIG. 2A.

FIG. 2B illustrates further detailed steps associated with the automatic synthesis and integration step of FIG. 2A. At 208, the specification for the digital blocks is specified, including the requirements and functionality of the digital blocks. Further, the connectivity of the digital blocks is defined, including power pins, input pins, output pins, clock pins, and so forth. Once the specification for the digital blocks is defined, HDL may be written for the digital design, at 210, using Verilog, SystemVerilog, VHDL, and the like.

With continued reference to FIG. 2B, following writing of the HDL, the design constraints for both the digital blocks and the support circuits are defined, at 212. This step involves defining the requirements that the HDL for the digital design must satisfy during logic synthesis and place-and-route, and includes specific timing requirements for the digital blocks.

Further referring to FIG. 2B, the defining constraints step, at 212 also includes defining the requirements for the desired supply circuits. Examples of such requirements include: supply voltage, power, frequency, latency, delay, and jitter, to name a few. The requirements are used to automatically generate the necessary support circuits used by the digital blocks. For some situations, the requirements for support circuits are higher level requirements, and could be the SOC specifications themselves.

Once the design constraints for the digital blocks and the support circuits are defined, the support circuits are automatically generated and integrated with the digital blocks, at 214. The support circuits are generated as netlists or HDL, such as Verilog, SystemVerilog, VHDL, or the like. A wrapper netlist, or HDL, is also generated that will encapsulate both the digital blocks and the support circuits together, and define the connections between the digital blocks and the support circuits.

Figure 2C:
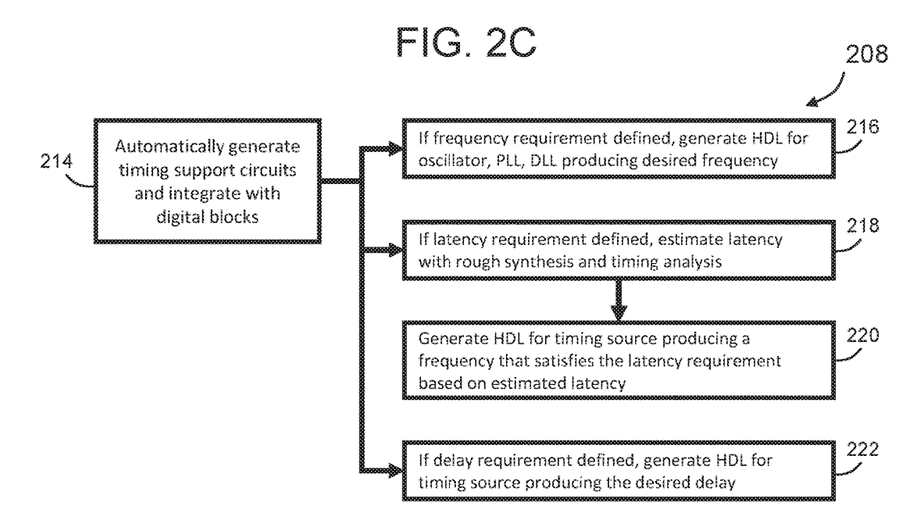
FIG. 2C illustrates steps corresponding to one embodiment of the automatic generation and integration with the digital blocks step of FIG. 2B.

For one specific embodiment involving timing sources, the automatic generation and integration with the digital blocks may take on steps as shown in FIG. 2C. When a specific frequency requirement is defined, HDL may be generated and integrated for an oscillator, PLL or DLL architecture that can produce the desired frequency, at 216.

Further referring to FIG. 2C, when a latency requirement is defined, HDL may be generated for a timing source with the frequency that meets the latency requirement. This generally involves performing a rough synthesis and static timing analysis on the digital block with test clocks, at 218, to estimate the latency through the circuits as a function of frequency. More specifically, the digital block is synthesized with test clocks using a random clock frequency. The latency is then measured. If the measured latency at the current clock frequency is larger than the requirement, then the frequency of the test clock is increased to reduce latency. If the measured latency is smaller, then the frequency of the test clock is decreased to increase latency and reduce power. Searching through the frequencies continues until the latency requirement is met or until the latency requirement is shown to be incompatible with the current design. HDL for a timing source with a frequency that satisfies the desired latency requirement may then be generated and integrated, based on the test clock latency measurement, at 220.

With continued reference to FIG. 2C, when a specific delay requirement is defined, HDL may be generated for a timing source that can produce, or compensate for, the delay requirements in the circuits, at 222. For example, one may include integrating multiple zero-delay buffers in the form of DLLs within the digital block to compensate and/or cancel the propagation delay of clock distribution networks. This may save power by simplifying the structure of the clock distribution lines. A further example includes integrating multiple DLLs, or multi-phase PLLs within the digital block to purposefully stagger clock edges, which may reduce the peak current by spreading switching activity or simplifying the clock trees.

Figure 2D:
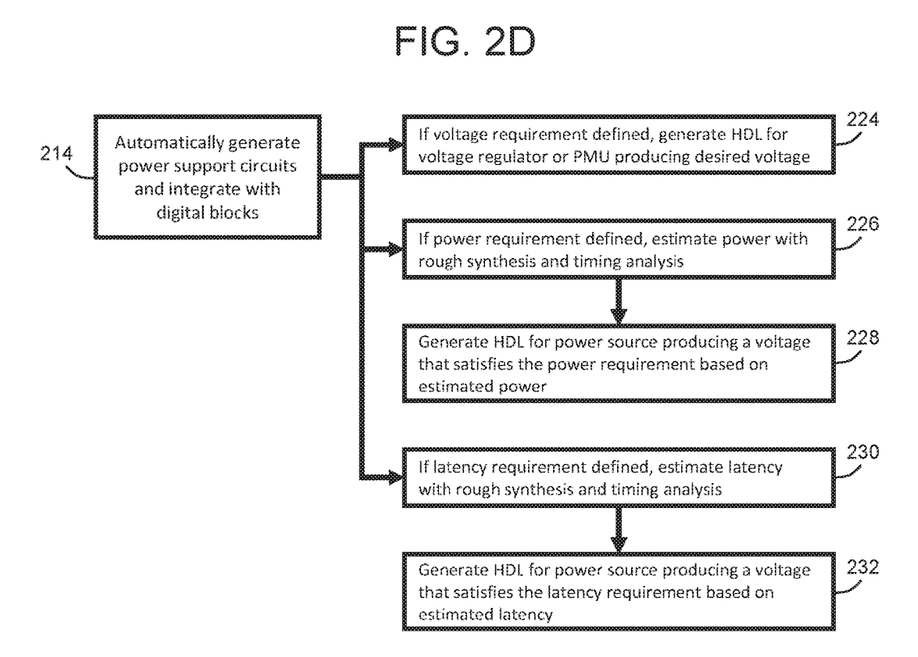
FIG. 2D illustrates steps corresponding to a further embodiment of the automatic generation and integration with the digital blocks step of FIG. 2B.

For specific embodiments involving power sources, the automatic generation and integration with the digital blocks may take on steps as shown in FIG. 2D. When a specific supply voltage requirement is defined, HDL may be generated and integrated for a voltage regulator, or PMU that can produce the desired supply voltage, at 224.

Further referring to FIG. 2D, when a specific power requirement is defined, HDL may be generated for a power source that meets the power requirement. This generally involves performing a rough synthesis and static timing analysis on the digital blocks with a test voltage, at 226, to estimate the power consumption of the circuit as a function of supply voltage. More specifically, the digital block is synthesized with test voltages using random voltages. The power consumption is then estimated. If the estimated power consumption at the current test voltage is larger than the requirement, then the test voltage is decreased to reduce power. If the estimated power consumption is smaller than the requirement, then the test voltage is increased, to increase power and improve performance. Various test voltage estimates may be iterated until the power requirement is met or until the power requirement is shown to be incompatible with the current design. HDL for a power source with a voltage that satisfies the desired power requirement may then be generated and integrated, based on the test voltage estimates, at 228.

With continued reference to FIG. 2D, when a specific latency requirement is defined (in the context of power), HDL may be generated for a power source that meets the latency requirement. This generally involves performing a rough synthesis and static timing analysis on the digital blocks with a test voltage, at 230, to estimate the latency of the circuit as a function of supply voltage. More specifically, the digital block is synthesized with test voltages using random voltages. The latency is then estimated. If the estimated latency at the current test voltage is larger than the requirement, then the test voltage is decreased to reduce the latency. If the estimated latency is lower than the requirement, then the test voltage is increased to increase latency and improve performance. Various test voltage estimates may be iterated until the latency is met or until the latency requirement is shown to be incompatible with the current design. HDL for a power source with a voltage that satisfies the desired latency requirement may then be generated and integrated, based on the test voltage estimates, at 232.

For some embodiments, the automatic generation and integration steps described above for timing sources and power sources may be carried out at the same time.

Referring back to FIG. 2B, after automatically generating and integrating the support circuits, concurrent logic-synthesis with optimization is carried out, at 234. During synthesis and in-place optimization, the HDL for both the digital blocks and support circuits contained inside the wrapper HDL will be mapped into logic gates using static timing analysis to drive the optimization for both the digital blocks and the support circuits. The optimization of the digital blocks and the support circuits is concurrent—that is, the optimization process will improve performance, power, and area for the digital blocks and the support circuits separately or can shift tradeoffs between the digital blocks and support circuits when the overall combination can be better optimized together. During the optimization process, if the timing is not satisfied, at 236, then portions of the HDL are modified, and the defining, automatically generating, and concurrent synthesis and optimization steps at 212, 214 and 234 are iteratively repeated as necessary.

If the static timing analysis indicates that the timing is satisfied, at 236, then a concurrent place-and-route with optimization step is carried out, at 240. During place-and-route and in-place optimization, the synthesized netlists for both the digital blocks and support circuits within the synthesized wrapper netlist will be converted into a physical implementation with static timing analysis driving the optimization for both the digital blocks and the support circuits. Similar to optimization during logic-synthesis, the optimization of the digital blocks and the support circuits is concurrent—that is, the optimization process will improve performance, power and area for the digital blocks and the support circuits separately or can shift tradeoffs between the digital blocks and the support circuits when the overall combination can be better optimized together. During the optimization process, if the timing is not satisfied, at 242, then portions of the HDL are modified, and the defining, automatically generating, concurrent synthesis and optimization, and concurrent place-and-route with optimization steps at 212, 214, 234, and 240 are iteratively repeated as necessary.

If the static timing analysis indicates that the timing is satisfied, at 242, then a concurrent verification step is carried out, at 244. During concurrent verification, functionality and timing will be checked across all operating conditions and process corners for both the digital blocks and the support circuits using static timing analysis within the digital design flow. The final output is a fully verified physical implementation for the digital block integrated with all the necessary support circuits.

Referring back to FIG. 2A, once the digital blocks and the support circuits are automatically synthesized and integrated, and the design goals satisfied, at 246, then a system verification is carried out, at 248, to simulate the entire SOC over various process corners and operating modes to ensure that the SOC meets the design specifications.

Since the support circuits are automatically generated and integrated, the digital blocks can be fully optimized for performance, power, and area in a manner previously unrealizable due to conventional limitations in available timing and power sources. Additionally, the integrated block is as portable and reusable across different process technologies as the digital blocks since the integrated block was created using the digital design methodology, not a custom design. Further, by implementing the support circuits within the digital design flow using digital design methodology, a more straightforward way to design digital blocks with support circuitry (typically analog) may be realized. Custom layouts and custom integrations are not required, nor are extensive co-simulations with SPICE required.

Figure 3A:
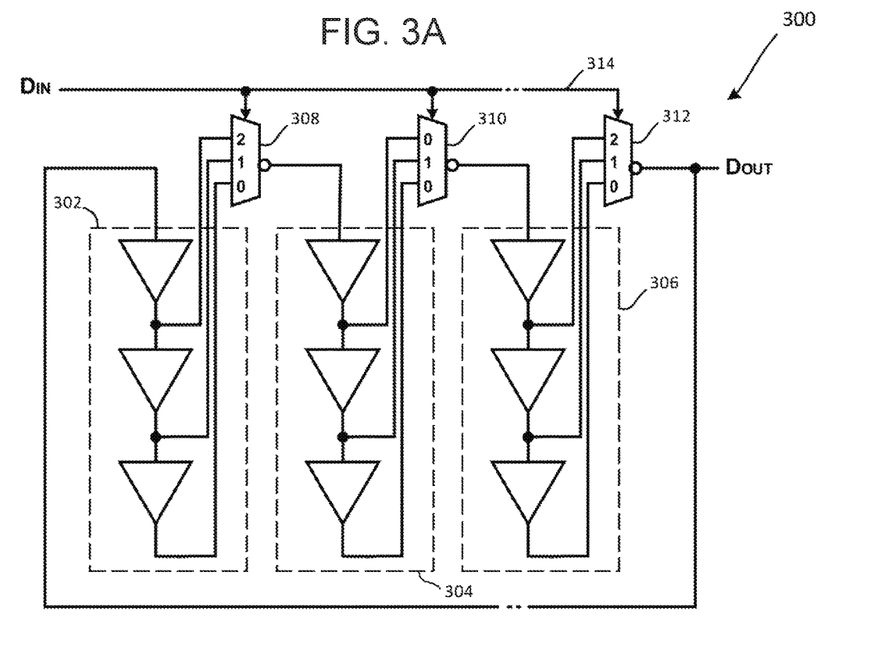
FIG. 3A illustrates one embodiment of an oscillator employed as a support circuit in the design flow of FIG. 2A.

FIG. 3A illustrates one specific example of a support circuit in the form of an oscillator circuit. The oscillator circuit, generally designated 300, is realized as a ring oscillator that includes multiple sets of delay buffers 302, 304, and 306 that feed respective multiplexers 308, 310 and 312. Each multiplexer may be switched in via a control signal $D_{IN}$ provided along an input control bus 314. The oscillator output is represented as $D_{OUT}$. The delay buffers can be switched in and out of the ring to control the total delay through the ring as well as the frequency of oscillation. As $D_{IN}$ increases, the frequency of the oscillator increases by muxing paths with less delay into the ring. Similarly, as $D_{IN}$ decreases, the frequency of the oscillator decreases by multiplexing paths with more delay into the ring.

Figure 3B:
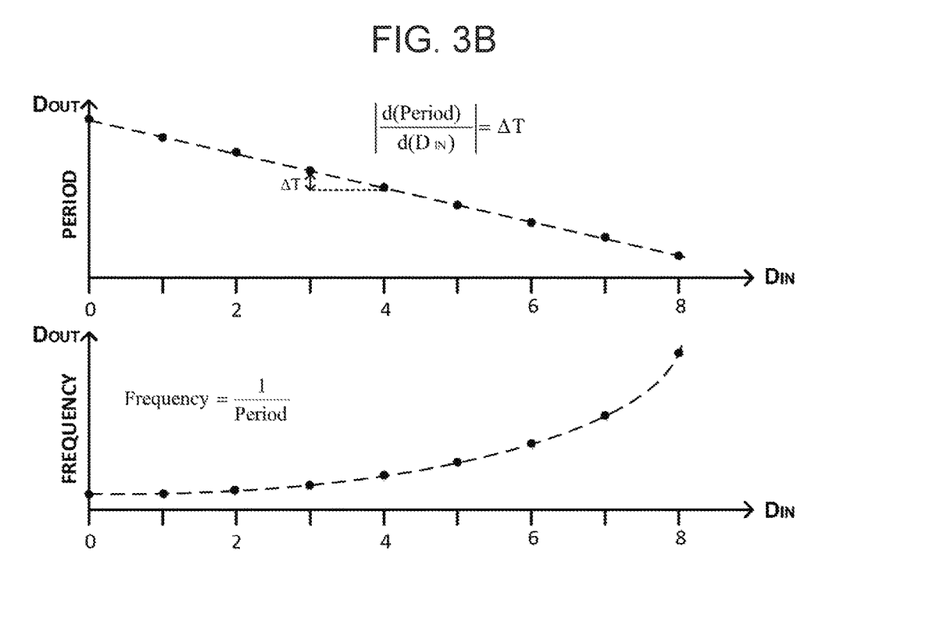
FIG. 3B is a graph illustrating the timing behavior for the oscillator circuit representation of FIG. 3A.

FIG. 3B illustrates the behavior of the oscillator of FIG. 3A, plotting both frequency and period of the output $D_{OUT}$ as a function of the input control signal $D_{IN}$. As the control word $D_{IN}$ increases, the period of $D_{OUT}$ decreases linearly with a slope of $\Delta T$, where $\Delta T$ is the delay through an individual delay element or buffer. As the control word increases, the frequency of the output $D_{OUT}$ increases hyperbolically.

The oscillator described above lends itself well to the design flow described above with respect to FIGS. 2A and 2B. Since the circuit comprises standard combinational digital gates such as inverters, buffers, NAND gates, etc., traditional static timing analysis techniques can be used to measure the propagation delay of signals through each stage of the ring, including the ring itself. Further, the oscillator shown in FIG. 3A can be described entirely in HDL, with variables defining the number of stages and the length of the buffer chains. This provides the means for automatically generating a wide range of oscillators supporting a wide variety of frequency ranges and resolutions.

Figure 4A:
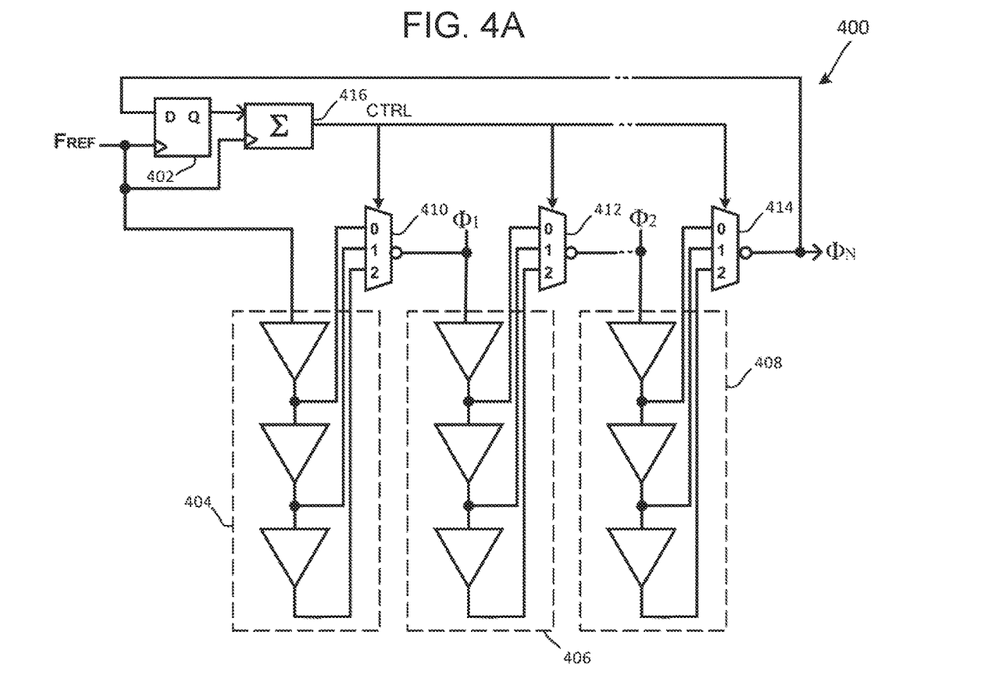
FIG. 4A illustrates one embodiment of a Delay-locked loop (DLL) employed as a support circuit in the design flow of FIG. 2A.

FIG. 4A illustrates one specific example of a support circuit in the form of a delay-locked loop (DLL) circuit. The DLL circuit, generally designated 400, includes a phase comparator 402 that, in one embodiment, is in the form of a flip-flop. A variable delay line similar to the ring oscillator structure described above and shown in FIG. 3A is provided. The delay line receives an input signal with a reference phase $F_{REF}$ and includes multiple sets of delay buffers 404, 406, and 408 that feed respective multiplexers 410, 412 and 414. An accumulator 416 generates a control signal CTRL to control the multiplexers, which have phase-delayed outputs $\Phi_1$, $\Phi_2$ and $\Phi_N$.

In operation, the delay elements may be switched in or out of the delay line via the multiplexers to control the total delay through each stage. Generally, when the control word CTRL increases, the delay through the delay line increases, and when the control word CTRL decreases, the delay through the delay line decreases. The flip-flop is used to measure the phase difference between the input signal phase $F_{REF}$ and the last phase $\Phi_N$ of the delay line. The output of the flip-flop represents an error signal that indicates the phase relationship between $F_{REF}$ and $\Phi_N$. When the output of the flip-flop goes low, the rising edge of $F_{REF}$ is early with respect to the rising edge of $\Phi_N$. When the output of the flip-flop goes high, the rising edge of $F_{REF}$ is late with respect to the rising edge of $\Phi_N$.

Further referring to FIG. 4A, the accumulator continuously adds the output of the flip-flop on every rising edge of $F_{REF}$, where a logic high from the flip-flop is interpreted as a +1 and a logic low from the flip-flop is interpreted as a −1. The accumulator output CTRL is fed back into the variable delay line and completes the feedback loop. If the input to the accumulator repeatedly receives a +1 from the flip-flop, indicating that the rising edge of $\Phi_N$ is occurring before the rising edge of $F_{REF}$, the output of the accumulator will increase, causing the delay between $F_{REF}$ and $\Phi_N$ to tend toward zero. If the input to the accumulator repeatedly receives a −1 from the flip-flop, indicating that the rising edge of $\Phi_N$ is occurring after the rising edge of $F_{REF}$, the output of the accumulator will decrease, causing the delay between $F_{REF}$ and $\Phi_N$ to again tend toward zero. When the input to the accumulator becomes a zero-mean signal alternating with some sequence of +1 and −1, the output of the accumulator, as averaged across multiple cycles, will stay constant. This indicates that the rising edge of $F_{REF}$ and $\Phi_N$ are aligned on average.

Figure 4B:
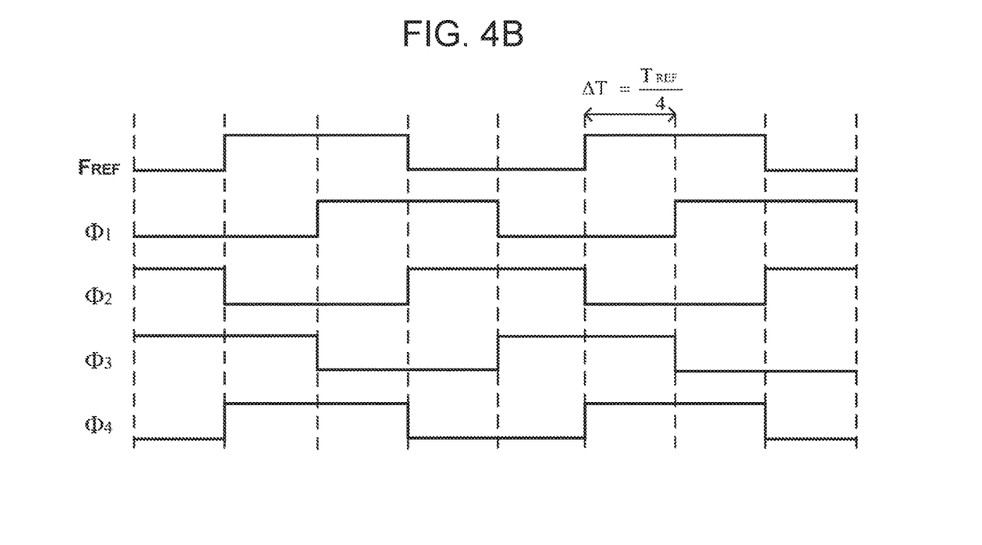
FIG. 4B is a graph illustrating the timing behavior for the DLL circuit representation of FIG. 4A.

FIG. 4B illustrates the behavior of the DLL of FIG. 4A, showing the respective delay relationships between $F_{REF}$ and the outputs of four stages of the DLL, with respective output delays $\Phi_1$, $\Phi_2$, $\Phi_3$, and $\Phi_4$. As shown in FIG. 4B, the rising edge of the last phase $\Phi_4$ is locked to the rising edge of $F_{REF}$, and the phase outputs from the DLL are roughly equi-spaced in time.

Similar to the oscillator circuit described above, the DLL circuit 400 lends itself well to the design flow described above with respect to FIGS. 2A and 2B. Since the circuit comprises standard combinational digital gates such as inverters, buffers, NAND gates, etc., traditional static timing analysis techniques can be used to measure the propagation delay of signals through each stage of the delay line. Further, the delay line shown in FIG. 4A can be described entirely in HDL, with variables defining the number of phases $\Phi_1$-$\Phi_N$, and the length of the buffer chains. This provides the means for automatically generating a wide range of DLLs supporting a wide variety of delay ranges and resolutions.

The oscillator circuit 300 and DLL circuit 400 described above are but two specific examples of support circuits that may be automatically generated via the methods described above. Further timing-related examples such as phase-locked loops (PLLs) and clock sources may be constructed in similar ways. Additionally, power sources and interfaces may also include similar constructions and may be generated and integrated in similar manners.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '$\overline{<signal\ name>}$') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A computer-implemented method comprising:
defining digital block specifications for the IC;
defining design constraints for the digital blocks and the support circuits;
automatically generating the support circuits and integrating the support circuits with the digital blocks;
logically-synthesizing the digital blocks with the support circuits at the logic gate level; and
optimizing the digital blocks and support circuits concurrently with logically-synthesizing.

2. The computer-implemented method according to claim 1, wherein:
the support circuits comprise circuit representations of timing source circuits.

3. The computer-implemented method according to claim 2, wherein:
the timing source circuits each comprise one from the group including an oscillator circuit, a DLL circuit, a PLL circuit, and an interface circuit.

4. The computer-implemented method according to claim 2, wherein the defined design constraints includes a latency requirement, and automatically generating the support circuits and integrating the support circuits with the digital blocks comprises:
estimating a latency based on a preliminary synthesis and timing analysis of the support circuits and digital blocks; and
generating a circuit representation for a timing source having a frequency that satisfies the latency requirement based on the estimated latency.

5. The computer-implemented method according to claim 1, wherein:
the support circuits comprise circuit representations of power source circuits.

6. The computer-implemented method according to claim 5, wherein:
the power source circuits each comprise one from the group including a voltage regulator and a PMU.

7. The computer-implemented method according to claim 5, wherein the defined design constraints includes a latency requirement, and automatically generating the support circuits and integrating the support circuits with the digital blocks comprises:
estimating a latency based on a preliminary synthesis and timing analysis of the support circuits and digital blocks; and
generating a circuit representation for a power source having a voltage that satisfies the latency requirement based on the estimated latency.

8. A non-transitory computer-readable storage medium, the medium storing instructions that when executed by a computer system will cause the computer system to:
in response to a command from a client to commence operations for a digital design flow for a digital system, perform an architectural level emulation of the IC based on digital block specifications;
define design constraints for the digital blocks and the support circuit;
automatically generate the support circuits and integrate the support circuits with the digital blocks;
logically-synthesize digital blocks with the support circuits; and optimize the digital blocks and support circuits concurrently with logically-synthesizing.

9. The non-transitory computer-readable storage medium of claim 8, wherein:
the support circuits comprise circuit representations of timing source circuits.

10. The non-transitory computer-readable storage medium of claim 9, wherein:
the timing source circuits each comprise one from the group including an oscillator circuit, a DLL circuit, a PLL circuit, and an interface circuit.

11. The non-transitory computer-readable storage medium of claim 8, wherein the defined design constraints includes a latency requirement, and automatically generating the support circuits and integrating the support circuits with the digital blocks comprises:
estimating a latency based on a preliminary synthesis and timing analysis of the support circuits and digital blocks; and
generating a circuit representation for a timing source having a frequency that satisfies the latency requirement based on the estimated latency.

12. The non-transitory computer-readable storage medium of claim 8,
wherein:
the support circuits comprise circuit representations of power source circuits.

13. The non-transitory computer-readable storage medium of claim 9, wherein:
the power source circuits each comprise one from the group including a voltage regulator and a PMU.

14. The non-transitory computer-readable storage medium of claim 8, wherein the defined design constraints includes a latency requirement, and automatically generating the support circuits and integrating the support circuits with the digital blocks comprises:
estimating a latency based on a preliminary synthesis and timing analysis of the support circuits and digital blocks; and
generating a circuit representation for a power source having a voltage that satisfies the latency requirement based on the estimated latency.

15. A computer-implemented method for manufacturing a system-on-chip (SOC) comprising:
defining digital block specifications for the IC;
defining design constraints for the digital blocks and the support circuits;
automatically generating the support circuits and integrating the support circuits with the digital blocks;
logically-synthesizing the digital blocks with the support circuits; and
optimizing the digital blocks and support circuits concurrently with logically-synthesizing.

16. The computer-implemented method for manufacturing an integrated circuit chip according to claim 15, wherein:
the support circuits comprise circuit representations of timing source circuits and/or power source circuits.

17. The computer-implemented method for manufacturing an integrated circuit chip according to claim 16, wherein:
the support circuits each comprise one from the group including an oscillator circuit, a DLL circuit, a PLL circuit, an interface circuit, a voltage regulator, and a PMU.

18. The computer-implemented method for manufacturing an integrated circuit chip according to claim 17, wherein the defined design constraints include a latency requirement, and automatically generating the support circuits and integrating the support circuits with the digital blocks comprises:
   estimating a latency based on a preliminary synthesis and timing analysis of the support circuits and digital blocks; and
   generating a circuit representation for a specified support circuit having an operating parameter that satisfies the latency requirement based on the estimated latency.

* * * * *